(12) United States Patent
Xue et al.

(10) Patent No.: US 9,839,021 B2
(45) Date of Patent: *Dec. 5, 2017

(54) METHOD AND APPARATUS FOR SELECTING DOWNLINK PRIMARY CARRIER FOR TRANSMITTING DATA

(71) Applicant: Huawei Technologies Co., Ltd., Shenzhen (CN)

(72) Inventors: Lixia Xue, Shenzhen (CN); Yujuan He, Shenzhen (CN); Chaojun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 550 days.

This patent is subject to a terminal disclaimer.

(21) Appl. No.: 14/487,950

(22) Filed: Sep. 16, 2014

(65) Prior Publication Data

US 2015/0003392 A1    Jan. 1, 2015

Related U.S. Application Data

(63) Continuation of application No. 13/069,851, filed on Mar. 23, 2011, now Pat. No. 8,908,649, which is a
(Continued)

(30) Foreign Application Priority Data

Sep. 23, 2008    (CN) .......................... 2008 1 0216300

(51) Int. Cl.
*H04W 4/00*    (2009.01)
*H04W 72/04*    (2009.01)
(Continued)

(52) U.S. Cl.
CPC ......... *H04W 72/042* (2013.01); *H04L 5/0055* (2013.01); *H04W 52/0229* (2013.01); *H04W 74/08* (2013.01); *Y02B 60/50* (2013.01)

(58) Field of Classification Search
None
See application file for complete search history.

(56) References Cited

U.S. PATENT DOCUMENTS

2003/0224730 A1* 12/2003 Muszynski ........... H04W 36/22
455/62
2006/0274712 A1* 12/2006 Malladi ............. H04B 1/70735
370/345
(Continued)

FOREIGN PATENT DOCUMENTS

CN    1719742 A    1/2006
CN    1722640 A    1/2006
(Continued)

OTHER PUBLICATIONS

Motorola, Physical Channel Definition for Downlink Dual Carrier Operation, 3GPP TSG GERAN#29, Apr. 24, 2006, 8 pages.
(Continued)

*Primary Examiner* — Kwang B Yao
*Assistant Examiner* — Hardikkumar Patel
(74) *Attorney, Agent, or Firm* — Brinks Gilson & Lione

(57) ABSTRACT

A method, an apparatus and a system for selecting a downlink primary carrier for transmitting data are disclosed. The method includes the following steps: A terminal obtains primary carrier selection information configured by a network; and the terminal determines a downlink carrier corresponding to an uplink carrier of the terminal as a downlink primary carrier for transmitting data according to the primary carrier selection information. In the embodiments of the present invention, the network selects a downlink carrier corresponding to an uplink carrier of the terminal as a downlink primary carrier for transmitting data. The terminal needs to detect only the downlink primary carrier, and the downlink carrier needs to be switched or detected only if the primary carrier receives a signaling message for detecting or
(Continued)

receiving other carriers, so it is not necessary to switch or detect the downlink carrier frequently, which reduces battery consumption of the terminal.

20 Claims, 3 Drawing Sheets

Related U.S. Application Data continuation of application No. PCT/CN2009/074093, filed on Sep. 22, 2009.

(51) Int. Cl.
*H04W 74/08* (2009.01)
*H04W 52/02* (2009.01)
*H04L 5/00* (2006.01)

(56) References Cited

U.S. PATENT DOCUMENTS

| | | | | |
|---|---|---|---|---|
| 2007/0155397 A1* | 7/2007 | Park | | H04W 24/00 455/453 |
| 2008/0287137 A1* | 11/2008 | Li | | H04L 5/0016 455/450 |
| 2008/0298224 A1* | 12/2008 | Pi | | H04L 5/0007 370/204 |
| 2009/0046649 A1* | 2/2009 | Gao | | H04L 1/1861 370/329 |
| 2010/0177654 A1* | 7/2010 | Charbit | | H04B 1/7087 370/252 |
| 2011/0141941 A1 | 6/2011 | Lee et al. | | |

FOREIGN PATENT DOCUMENTS

| | | |
|---|---|---|
| CN | 1750703 A | 3/2006 |
| CN | 1983918 A | 6/2007 |
| CN | 101145826 A | 3/2008 |
| WO | WO 00/64059 A2 | 10/2000 |
| WO | WO 03/094539 A1 | 11/2003 |
| WO | WO 2006/072821 A1 | 7/2006 |

OTHER PUBLICATIONS

"3rd Generation Partnership Project; Technical Specification Group Radio Access Network; Dual-Cell HSDPA operation" 3GPP TR 25.825, V1.0.0, May 2008, 67 pages.

Ericsson, "Carrier aggregation in LTE-Advanced" Agenda Item 12, TSG-RAN WG1 #53bis, Warsaw, Poland, Jun. 30-Jul. 4, 2008, 6 pages.

Qualcomm Europe, "Dual Carrier HSDPA assumptions and standards impact" Agenda Item 9, 3GPP TSG-RAN WG1#52bis, Shenzhen, China, Mar. 31-Apr. 4, 2008, 6 pages.

"3rd Generation Partnership Project; Technical Specification Group Radio Access Network; Evolved Universal Terrestrial Radio Access (E-UTRA); Physical Channels and Modulation" (Release 8) 3GPP TS 36.211, V8.4.0, Sep. 2008, 78 pages.

"3rd Generation Partnership Project; Technical Specification Group Radio Access Network; Evolved Universal Terrestrial Radio Access (E-UTRA); Physical Layer procedures" (Release 8) 3GPP TS 36.213, V8.4.0, Sep. 2008, 60 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description" Stage 2 (Release 8) 3GPP TS 36.300, V8.6.0, Sep. 2008, 137 pages.

3rd Generation Partnership Project; Technical Specification Group Radio Access Network; Evolved Universal Terrestrial Radio Access (E-UTRA) Radio Resource Control (RRC); Protocol specification (Release 8) 3GPP TS 36.331, V8.3.0, Sep. 2008, 178 pages.

Motorola, "Physical Channel Definition for Downlink Dual Carrier" 3GPP TSG GERAN#29, San Jose Del Cabo, Mexico, Apr. 24-28, 2006, 8 pages.

\* cited by examiner

METHOD AND APPARATUS FOR SELECTING DOWNLINK PRIMARY CARRIER FOR TRANSMITTING DATA

CROSS-REFERENCE TO RELATED APPLICATIONS

This application is a continuation of U.S. application Ser. No. 13/069,851, filed on Mar. 23, 2011, which is a continuation of International Application No. PCT/CN2009/074093, filed on Sep. 22, 2009, which claims priority to Chinese Patent Application No. 200810216300.8, filed on Sep. 23, 2008, all of which are hereby incorporated by reference in their entireties.

FIELD OF THE INVENTION

The present invention relates to communications technologies, and in particular, to a method, an apparatus, and a system for selecting a downlink primary carrier for transmitting data.

BACKGROUND OF THE INVENTION

A Long Term Evolution-Advanced (LTE-A) system supports transmission bandwidth greater than 20 MHz, and even 100 MHz. To support wider bandwidth and be more compatible with the LTE system, two or more carriers may be aggregated. A terminal may receive or transmit data on one or more carriers simultaneously according to capabilities of the terminal and service requirements. An LTE-A terminal capable of receiving or transmitting data through bandwidth greater than 20 MHz can receive or transmit data on multiple carriers simultaneously; but an LTE terminal can receive or transmit data on a single downlink carrier compliant with the Rel-8 specifications and the corresponding uplink carrier only.

Carrier aggregation refers to aggregation of multiple carriers of a continuous or discrete spectrum. Each carrier may be an LTE carrier, namely, a backward-compatible carrier, which is accessible by an LTE terminal. Or, some carriers are non-LTE carriers, namely, non-backward-compatible carriers, which are not accessible by an LTE terminal. Among the carriers that are aggregated, the bandwidth of one carrier may be the same as or different from the bandwidth of another. For example, a 5M carrier is aggregated with a 10M carrier. In practice, carrier aggregation depends on capabilities of a terminal, service requirements and network configuration. For example, for N downlink carriers and M uplink carriers configured in the network, a high-capability terminal may use N downlink carriers and M uplink carriers, and a low-capability terminal may use N downlink carriers or part of the downlink carriers, but can select only one or some of the M uplink carriers for transmitting data.

For an LTE Frequency Division Duplex (FDD) system, a downlink carrier band always uniquely corresponds to an uplink carrier band, thus forming a pair of uplink and downlink carriers of the FDD system. The mapping relation between the uplink carrier and the downlink carrier is configured by the system. The transmission function of certain channels on the uplink carrier depends on the signaling transmitted by the downlink carrier. For example, a Dedicated Broadcast Channel (D-BCH) of the LTE downlink carrier bears information of the uplink Random Access Channel (RACH) and time-frequency resource information of the uplink Physical Uplink Control Channel (PUCCH).

In a multi-carrier system, a terminal-specific primary carrier concept and some applications are put forward. A primary carrier is a carrier where a terminal needs to receive and detect data frequently and which transmits information controlling whether data needs to be received by other downlink carriers or not. The primary carrier facilitates other mechanisms such as the application of the method of scheduling Discontinuous Reception (DRX)/Discontinuous Transmission (DTX) and Voice over IP (VoIP) services continuously. In addition, other carrier-related control information may also be carried on the primary carrier, for example, information about the frequency location of other carriers, and bandwidth. For a terminal capable of receiving more than one carrier simultaneously, continuous detection of great bandwidth (namely, multiple carriers) consumes too much power. In the concept of the terminal-specific primary carrier, the terminal needs to detect only the primary carrier. In this way, the battery consumption of the LTE-A terminal is reduced, and the requirement for using multiple carriers to transmit data is still fulfilled.

However, in the existing multi-carrier FDD system, the selection of the primary carrier of the terminal is independent of the uplink Transmitting (TX) carrier. That is, the selection of the primary carrier does not depend on the uplink carrier on which the data is transmitted. In an LTE system, the broadcast signaling in the corresponding downlink carrier carries the random access information of the uplink carrier and the information about the time-frequency resources occupied by the control signaling of the uplink carrier, and such information changes frequently. For an LTE-A system that supports multiple carriers, if the downlink primary carrier selected by the terminal does not correspond to any carrier of the data sent on the uplink, the terminal needs to detect the broadcast information of the downlink carrier corresponding to the uplink carrier frequently to obtain the random access information related to the uplink carrier transmission or information about the time-frequency resources occupied by the control signaling; further, the terminal needs to switch and detect the downlink carrier corresponding to the uplink TX carrier constantly, which increases the battery consumption of the terminal.

SUMMARY OF THE INVENTION

Embodiments of the present invention provide a method and an apparatus for selecting a downlink primary carrier for transmitting data to solve the problem of terminal battery consumption caused by frequent switching and detection of carriers.

Embodiments of the present invention provide the following technical solution:

A method for selecting a downlink primary carrier for transmitting data includes:
configuring primary carrier selection information of a terminal, where the primary carrier selection information indicates that a downlink carrier corresponding to an uplink carrier of the terminal serves as a downlink primary carrier of the terminal; and
notifying the primary carrier selection information to the terminal.

A method for selecting a downlink primary carrier for transmitting data includes:
obtaining primary carrier selection information;
determining a downlink carrier corresponding to an uplink carrier of a terminal as a downlink primary carrier for transmitting data according to the primary carrier selection information.

An NodeB (NB) includes:

a configuring module, adapted to configure primary carrier selection information of a terminal, where the primary carrier selection information indicates that a downlink carrier corresponding to an uplink carrier of the terminal serves as a downlink primary carrier of the terminal; and a first notifying module, adapted to notify the primary carrier selection information to the terminal.

A terminal includes:

an obtaining module, adapted to obtain primary carrier selection information notified by an NB; and a determining module, adapted to determine a downlink carrier corresponding to an uplink carrier of the terminal as a downlink primary carrier for transmitting data according to the primary carrier selection information.

A system for selecting a downlink primary carrier for transmitting data includes:

an NB, adapted to configure primary carrier selection information of a terminal, and notify the primary carrier selection information to the terminal, where the primary carrier selection information indicates that a downlink carrier corresponding to an uplink carrier of the terminal serves as a downlink primary carrier of the terminal; and the terminal, adapted to obtain the primary carrier selection information sent by the NB, and determine a downlink carrier corresponding to an uplink carrier of the terminal as a downlink primary carrier for transmitting data according to the primary carrier selection information.

In the embodiments of the present invention, the network selects a downlink carrier corresponding to an uplink carrier of the terminal as a downlink primary carrier for transmitting data. The terminal needs to detect only the downlink primary carrier, and the downlink carrier needs to be switched or detected only if a signaling message for detecting or receiving other carriers is received over the primary carrier, so it is not necessary to switch or detect the downlink carrier frequently, which reduces battery consumption of the terminal.

BRIEF DESCRIPTION OF THE DRAWINGS

To describe the technical solution under the present invention more clearly, the following describes the accompanying drawings involved in the description of the embodiments of the present invention. Apparently, the accompanying drawings outlined below are illustrative and not exhaustive. Persons of ordinary skill in the art can derive other drawings from such accompanying drawings without any creative effort.

DETAILED DESCRIPTION OF THE EMBODIMENTS

The following detailed description is provided with reference to the accompanying drawings to provide a thorough understanding of the present invention. Evidently, the drawings and the detailed description are merely representative of particular embodiments rather than all embodiments of the present invention. All other embodiments, which can be derived by those skilled in the art from the embodiments provided herein without any creative effort, shall fall within the scope of the present invention.

To make the merits of the technical solution under the present invention clearer, the following describes the embodiments of the present invention in more detail with reference to the accompanying drawings.

An LTE-A terminal begins to search the network after power-on. When finding a synchronization signal on a downlink carrier, if the synchronization signal fulfills a set threshold, the terminal starts receiving information on the primary broadcast channel, obtains the bandwidth information and antenna information of the downlink carrier, detects a control channel to obtain the D-BCH broadcast information, and obtains the Physical Random Access Channel (PRACH) resource on the uplink carrier corresponding to the downlink carrier. At this time, the terminal sends RACH information about the corresponding PRACH resource to perform uplink synchronization. When the uplink-downlink synchronization is complete and the necessary system information is obtained, the random access of the terminal succeeds, and data can be transmitted between the terminal and the NB.

Embodiment 1

Figure 1:
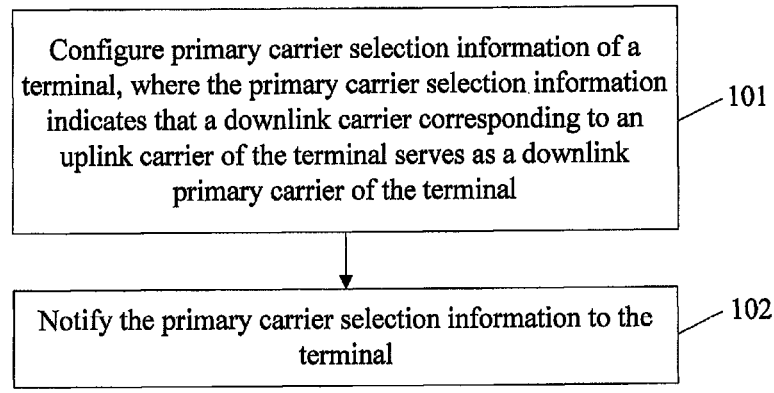
FIG. 1 is a flowchart of a method for selecting a downlink primary carrier for transmitting data in a first embodiment of the present invention.

A method for selecting a downlink primary carrier for transmitting data is provided in this embodiment. As shown in FIG. 1, the method includes the following steps:

101. For an LTE-A multi-carrier system, the network configures primary carrier selection information of a terminal, where the primary carrier selection information indicates that a downlink carrier corresponding to an uplink carrier of the terminal serves as a downlink primary carrier of the terminal.

102. The network notifies the primary carrier selection information to the terminal.

The network may send the downlink primary carrier selection information to the terminal through explicit or implicit signaling.

The network configures the number of uplink carriers and the number of downlink carriers for the terminal according to factors such as uplink and downlink service requirements and transmission and sending capabilities; notifies any one or any combination of each carrier frequency, bandwidth, and carrier identifier to the terminal; and configures the uplink carriers and downlink carriers of the terminal, and notifies the configuration to the terminal. According to any one or any combination of the load condition of each carrier, state of channels on each carrier, and the transmission and sending capabilities of the terminal, the network selects a downlink carrier corresponding to an uplink carrier of the terminal as a downlink primary carrier, configures the downlink primary carrier, and notifies the configuration to the terminal. Further, the network may add the configuration information of uplink carriers and downlink carriers and the downlink primary carrier information into one signaling message, and send the message to the terminal.

If both explicit signaling and implicit signaling are supported, explicit signaling takes priority over implicit signaling. That is, if the terminal detects the explicit signaling related to the primary carrier, the primary carrier information indicated by the explicit signaling prevails; if the terminal detects no explicit signaling related to the primary carrier configuration, the network sets the downlink carrier corresponding to random access of the terminal as a downlink primary carrier. Explicit signaling refers to a dedicated higher-layer signaling message or other dynamic signaling messages notified to the terminal. After receiving the explicit signaling, the terminal sets the downlink primary carrier indicated by the network as a downlink primary carrier. Implicit signaling refers to the following: If the terminal knows that the network supports the setting of the primary carrier, or if the terminal knows that the network supports the setting of the primary carrier and that the network has configured multiple uplink carriers or multiple downlink carriers for the terminal, and, if the terminal receives no explicit signaling that carries the primary carrier information from the network, the terminal regards the downlink carrier corresponding to uplink random access as a downlink primary carrier by default.

If the network supports that the terminal is notified only by explicit signaling, an explicit signaling method may be: The network sends a dedicated higher-layer signaling message or other dynamic signaling messages to the terminal, and the terminal sets the downlink primary carrier indicated in the received signaling message as a downlink primary carrier.

If the network supports that the terminal is notified only by implicit signaling, the implicit signaling method may be: If the terminal knows that the network supports the setting of the primary carrier, or if the terminal knows that the network supports the setting of the primary carrier and that the network has configured multiple uplink carriers or multiple downlink carriers for the terminal, both the network and the terminal regard the downlink carrier corresponding to uplink random access as their downlink primary carrier implicitly.

After receiving the primary carrier configured by the network, the terminal needs to keep detecting only the downlink primary carrier. The terminal receives or sends data on other carriers only if the primary carrier receives control information indicating the need of receiving or sending data on the other carriers.

The network may notify the terminal to switch the primary carrier according to the network load condition or channel quality of the terminal. The network may notify the terminal to switch the primary carrier in semi-static mode. In this case, the terminal switches the downlink primary carrier according to the primary carrier switching information sent by the network.

(1) The network notifies the terminal to switch the primary carrier according to load conditions.

For example, if the downlink primary carrier of the terminal or the corresponding uplink carrier bears heavier load currently, the network may reconfigure the downlink primary carrier of the terminal, and send control information to the terminal as an indication of switching the primary carrier.

(2) The network notifies the terminal to switch the primary carrier according to channel quality of the terminal.

For example, if the terminal detects that the downlink primary carrier or the corresponding uplink carrier has poor quality of channels, the terminal may send a request for switching the primary carrier. The request may be an explicit request for switching the primary carrier. After receiving the request, the network checks whether another carrier is suitable for serving as a downlink primary carrier of the terminal. If the network regards another carrier suitable as the downlink primary carrier of the terminal, the network notifies the terminal to switch the primary carrier to this carrier. If the network regards no other carrier as suitable for serving as the downlink primary carrier of the terminal, the network notifies the terminal to remain the primary carrier unchanged. Or, the terminal sends no request for switching the primary carrier, but chooses to access the network again, thus changing the carrier accessed by the terminal; or triggers the network to reconfigure the primary carrier. Persons of ordinary skill in the art know that other factors or modes may trigger the network or terminal to switch the primary carrier.

Control signaling for controlling other carriers may be sent on the downlink primary carrier. The control signaling may carry content, such as the DRX/DTX parameter configuration corresponding to other downlink carriers or uplink carriers, frequency positions and bandwidth of other downlink carriers or uplink carriers, measurement periods and feedback mechanisms of other downlink carriers or uplink carriers, and information indicating whether other carriers transmit data.

Embodiment 2

A method for selecting a downlink primary carrier of a terminal capable of uplink-downlink asymmetric carrier aggregation is provided in this embodiment.

Figure 2:
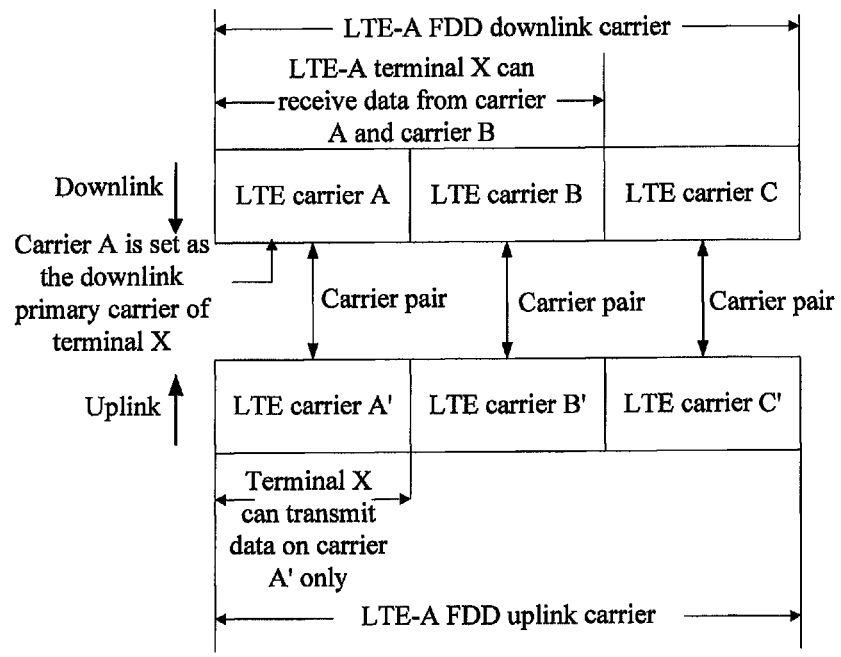
FIG. 2 shows selection of a downlink primary carrier of a terminal with limited transmission capabilities in a second embodiment of the present invention.

As shown in FIG. 2, multiple carriers of an LTE-A system may derive from aggregation of multiple carriers of an old LTE system. FIG. 2 shows an LTE-A system spectrum composed of three spectrum pairs of the old LTE FDD system, namely, downlink carrier A, downlink carrier B, and downlink carrier C of the old LTE FDD system, and the corresponding uplink carrier N, uplink carrier B', and uplink carrier C'. That is, the downlink carrier A and the corresponding uplink carrier A' of the LTE system make up a carrier pair of the old LTE FDD system, carrier B and carrier B' make up another pair, and carrier C and carrier C' make up another pair. In a subframe, terminal X can send data on only one uplink carrier. It is assumed that the uplink carrier is uplink carrier A'.

By taking account of the uplink and downlink service requirements of terminal X, and capabilities of TX carriers and Receiving (RX) carriers, the network configures the number of uplink carriers, the number of downlink carriers, and the specific carriers for the terminal, that is, carrier A and carrier B are downlink RX carriers of terminal X, and carrier A' is an uplink TX carrier; and configures the downlink primary carrier for the terminal according to the network load condition and the transmission and sending capabilities of the terminal. The configuration comes in the following scenarios:

Scenario 1: If the downlink carrier A and the corresponding uplink carrier A' bear lighter load, because terminal X can send data on only uplink carrier A', the downlink carrier A is the downlink primary carrier of terminal X according to the method of selecting a downlink carrier corresponding to an uplink carrier as a primary carrier. Afterward, the network notifies the downlink primary carrier information to terminal X, or the downlink primary carrier information is sent along with the number of uplink carriers and the number of downlink carriers configured for terminal X, the specific carrier frequency, and the bandwidth to terminal X.

Scenario 2: If the downlink carrier A and/or the corresponding uplink carrier A' bear heavier load and unable to provide excellent transmission services for terminal X, because terminal X can send data on only uplink carrier A', and the only downlink carrier A corresponding to the uplink carrier A' bears heavier load and unsuitable for serving as the downlink primary carrier of terminal X, the network may notify the terminal to select another downlink carrier for accessing the network and trigger the terminal to select a new uplink TX carrier, and the network reconfigures the downlink primary carrier for the terminal; or, the network selects another carrier as a new primary carrier of terminal X, and notifies information about the new primary carrier to terminal X, whereupon terminal X establishes a connection to this primary carrier and begins communication.

Scenario 3: If the network has set carrier A as the downlink primary carrier of terminal X, the network load condition on downlink carrier A may change afterward so that the downlink primary carrier A or the corresponding uplink carrier A' of terminal X bears heavier load. In this case, the network may notify the terminal to select another downlink carrier for accessing the network and trigger the terminal to select a new uplink TX carrier, and the network reconfigures the downlink primary carrier for the terminal; or, the network selects another carrier as a new primary carrier of terminal X, and notifies the information about the new primary carrier to terminal X, whereupon terminal X establishes a connection to this primary carrier and the corresponding uplink carrier and begins communication.

Scenario 4: After a period, if terminal X finds that the channel quality of the downlink primary carrier A or the corresponding uplink carrier A' is poor or even too poor to communicate, terminal X may send a request for switching the primary carrier. After receiving the request, the network may select another carrier as a new primary carrier of terminal X, and notify the information about the new primary carrier to terminal X, whereupon terminal X establishes a connection to the primary carrier and the corresponding uplink carrier and begins communication; or, terminal X selects another carrier for accessing the network directly, and selects a new uplink TX carrier, and the network reconfigures the downlink primary carrier for the terminal, thus finishing switching the primary carrier.

Embodiment 3

A method for selecting a downlink primary carrier of a terminal capable of uplink-downlink symmetric carrier aggregation is provided in this embodiment.

Figure 3:
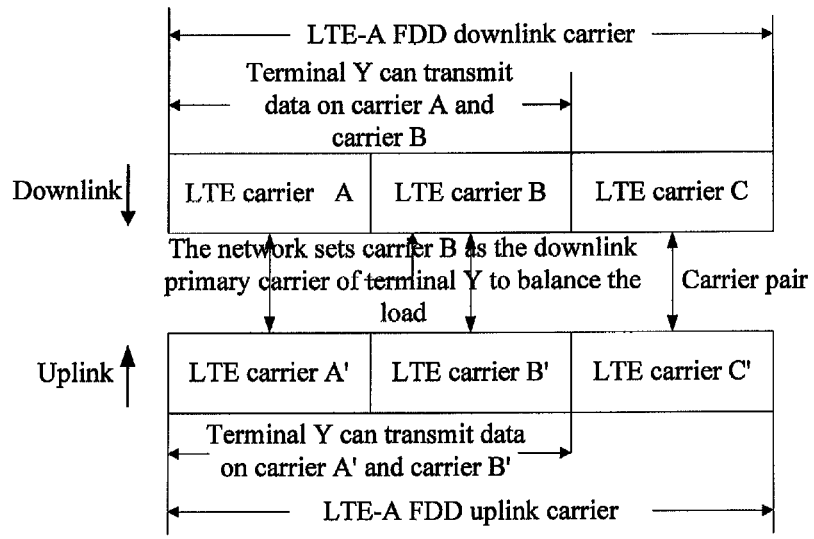
FIG. 3 shows selection of a downlink primary carrier of a terminal with symmetric receiving and transmission capabilities in a third embodiment of the present invention.

As shown in FIG. 3, multiple carriers of an LTE-A system derive from aggregation of multiple carriers of an old LTE system. That is, each carrier of the LTE-A system is backward-compatible. FIG. 3 shows three spectrum pairs of an old LTE FDD system, namely, downlink carrier A, downlink carrier B, and downlink carrier C of the LTE system, and the corresponding uplink carrier A', uplink carrier B', and uplink carrier C'. That is, the downlink carrier A and the corresponding uplink carrier A' of the LTE system make up a spectrum pair of the old LTE FDD system, carrier B and carrier B' make up another pair, and carrier C and carrier C' make up another pair. In a subframe, terminal Y can send data on uplink carrier A' and carrier B' simultaneously, and receive data on downlink carrier A and carrier B simultaneously.

By taking account of the uplink and downlink service requirements of terminal Y, and capabilities of TX carriers and RX carries, the network configures the number of uplink carriers and the number of downlink carriers as well as the specific carriers for the terminal: carrier A and carrier B are downlink RX carriers of terminal Y, and carrier A' and carrier B' are uplink TX carriers, and configures the downlink primary carrier for the terminal according to the network load condition and the transmission and sending capabilities of the terminal.

Because terminal Y can send data on uplink carrier A' and uplink carrier B' simultaneously, either downlink carrier A or downlink carrier B corresponding to them may serve as a downlink primary carrier, depending on the load conditions of carrier A, carrier B, carrier A' and carrier B'. That is, the network selects a downlink carrier in a lighter-load carrier pair as the downlink primary carrier. Here, supposing that downlink carrier B and the corresponding uplink carrier B' bear lighter load, the network selects carrier B as the downlink primary carrier of terminal Y. Finally, the network notifies the downlink primary carrier information to terminal Y, or the downlink primary carrier information is sent along with the number of uplink carriers and the number of downlink carriers configured for terminal Y, the specific carrier frequency, and the bandwidth to terminal Y.

If the network has set carrier B as the downlink primary carrier of terminal Y, the network load condition may change afterward so that the downlink primary carrier B or the corresponding uplink carrier B' of terminal Y bears heavier load. In this case, the network may reconfigure the downlink primary carrier and send a control signaling message to terminal Y as an indication of switching the downlink primary carrier to carrier A. Or, after a period, if the network or terminal Y finds that the channel quality of the downlink primary carrier B or the corresponding uplink carrier B' is poor or even too poor to communicate, the network may reconfigure the downlink primary carrier and send a control signaling message to terminal Y as an indication of switching the downlink primary carrier to carrier A; or, terminal Y sends a request for switching the primary carrier to carrier A, and, after receiving the request, the network checks whether carrier A bears lighter load; if the carrier A bears lighter load, the network approves the request for switching the primary carrier of terminal Y to carrier A, and sends a signaling message for indicating that terminal Y needs to switch the primary carrier; or, terminal Y selects another carrier for accessing the network directly, and the network reconfigures the downlink primary carrier for the terminal, thus finishing switching the primary carrier.

In an LTE system, a Control Format Indicator (CFI) channel, namely, a Physical CFI Channel (PCFICH), transmits different CFI values indicating the number of symbols occupied by a Physical Downlink Control Channel (PDCCH) for transmission. In an LTE-A system, if the network has configured multiple downlink carriers, the CFI value of each carrier may be the same or configured independently. If the CFI value of each carrier is configured independently, each carrier may select the number of resources occupied by the PDCCH adaptively according to the scheduling state on the carrier, with a view to optimizing the consumption of control signaling resources. Therefore, every carrier can be designed in a modular way. In a multi-carrier system, especially if one NB schedules multiple carriers jointly, the CFI may be set to the same value by taking account of the signaling and resource occupation of the PDCCH of all carriers. If all carriers have the same CFI value, the terminal with multiple downlink carriers can obtain the PDCCH occupation state on all carriers by detecting one downlink carrier only, thus simplifying the terminal processing; or the terminal detects the CFI values of two or more configured downlink carriers jointly, thus improving performance of detecting the CFI.

The two scenarios analyzed above have their own merits. Therefore, the network may set the CFI of two or more carriers to the same value or different values according to specific conditions. Specifically, dedicated control information on the primary carrier indicates whether the CFI value of other carriers is the same as or different from the CFI value of the primary carrier. Because the CFI value of each carrier is common information of all terminals on this carrier, the CFI value may also be broadcast on the primary carrier. If the CFI values of two or more carriers are the same, the terminal with such downlink carriers can obtain the PDCCH occupation state on other carriers by detecting one downlink carrier only, thus simplifying the terminal processing; or the terminal detects the CFI values of two or more configured downlink carriers jointly, thus improving performance of detecting the CFI. If the CFI value varies between two or more carriers, the terminal with such downlink carriers needs to detect not only the PCFICH on the downlink primary carrier, but also the PCFICH on all other carriers to obtain the PDCCH occupation state in the current subframe. However, the PCFICH detection result is further verified through such different CFI values of the carriers, thus improving detection performance to some extent.

Or, the network may configure the CFI value of two or more carriers independently. Specifically, the CFI value of other carriers is carried in the dedicated control information, or broadcast on the primary carrier. In this way, the terminal with such downlink carriers needs to detect the PCFICH on the downlink primary carrier, and obtain the PDCCH occupation state in the current subframe on such carriers according to the CFI value of other carriers indicated by the downlink primary carrier.

In an LTE-A system, if multiple downlink or uplink carriers are configured for one terminal, the VoIP service for this terminal is transmitted on the downlink primary carrier and the corresponding uplink carrier. In this way, the transmission efficiency of small packets is improved; moreover, such a service requiring continuous detection is preferably scheduled on the primary carrier to avoid frequent switching between the detection of the primary carrier and the detection of other carriers in the service involving small packets.

An LTE-A terminal needs to support receiving two or more carriers to obtain bandwidth greater than 20 MHz. If the network uses multiple downlink carriers to send downlink data to the terminal, more than one uplink response signaling message (ACKnowledgement (ACK) or Negative ACKnowledgement (NACK)) may exist. The method of transmitting more than one uplink response signaling message may depend on the capability of the uplink TX carrier of the terminal or the capability of the network configuring the uplink transmission of the terminal. If the terminal is capable of using only one uplink carrier for transmitting data, all uplink control signaling messages need to be sent on this carrier, and this uplink carrier is an uplink primary carrier, namely, the uplink carrier corresponding to the downlink primary carrier. An uplink primary carrier and a corresponding downlink primary carrier make up a pair of uplink and downlink carriers. The ACK/NACK resources on the uplink primary carrier may be reserved according to the corresponding downlink primary carrier, and may be obtained according to the mapping to the first Control Channel Element (CCE) sequence number occupied by the PDCCH of the terminal or the mapping to multiple CCE sequence numbers occupied by the PDCCH on the downlink primary carrier.

Alternatively, the ACK/NACK channel resources corresponding to multiple downlink carriers of the terminal on the uplink primary carrier may be obtained according to a rule of mapping between the PDCCH on the downlink primary carrier and the ACK/NACK channel on the uplink primary carrier, and according to a rule of mapping between the PDCCH on the downlink non-primary carriers and the ACK/NACK channel on the uplink primary carrier. The rule of mapping between the PDCCH on the downlink primary carrier and the ACK/NACK channel on the uplink primary carrier comply with the LTE system mapping method. The rule of mapping between the PDCCH on the downlink non-primary carriers and the ACK/NACK channel on the uplink primary carrier may comply with a new mapping method, and the sequence number of the ACK/NACK channel corresponding to the PDCCH on the downlink non-primary carrier is not collided with the sequence number of ACK/NACK channel corresponding to the PDCCH on the downlink primary carrier. In this way, the ACK/NACK channel resources reserved for the primary carrier are preferred, and the transmission efficiency is improved.

Alternatively, some uplink ACK/NACK resources on the uplink primary carrier are directly reserved for other downlink carriers. The positions of the reserved resources may be arranged from the primary carrier to adjacent carriers, and so on. The resource reserved on the carrier farthest away from the primary carrier is located in the position closest to a Physical Uplink Shared Channel (PUSCH), but the mapping method may be the same as that of the LTE system or not.

According to the obtained ACK/NACK channel resources, the following transmission methods are applicable:

Method 1: Send the uplink ACK/NACK messages corresponding to multiple downlink carriers by bundling the ACK/NACK messages together, namely, send the ACK message only if the data on all downlink carriers is received correctly, and send the NACK message if the data on any carrier is received incorrectly.

Method 2: Send the uplink ACK/NACK messages corresponding to multiple downlink carriers in multiplexing mode or parallel transmission mode. The specific multiplexing mode may be a channel selection method in an LTE Time Division Duplex (TDD) system, or any other multiplexing method, which is not limited herein.

If the number of uplink carriers is symmetric to the number of downlink carriers of the terminal, or the number of uplink carriers of the terminal is greater than 1, the uplink channels corresponding to multiple downlink carriers may send data on multiple corresponding uplink carriers, or send data on more than one uplink carrier configured by the terminal, or may be aggregated on an uplink primary carrier directly. The two methods above are still applicable. As regards other uplink control channels such as Channel Quality Indicators (CQIs) corresponding to multiple downlink carriers, a similar method applies.

Embodiment 4

Figure 4:
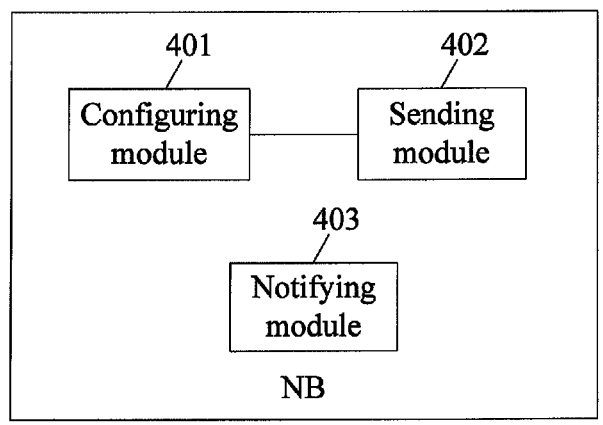
FIG. 4 shows a structure of an NB provided in a fourth embodiment of the present invention.

As shown in FIG. 4, an NB provided in this embodiment includes:

a configuring module 401, adapted to configure primary carrier selection information of a terminal, where the primary carrier selection information indicates that a downlink carrier corresponding to an uplink carrier of the terminal serves as a downlink primary carrier of the terminal; and a first notifying module 402, adapted to notify the primary carrier selection information to the terminal.

The NB further includes:

a second notifying module 403, adapted to notify the terminal to switch the primary carrier according to the network load condition or channel quality of the terminal.

Embodiment 5

Figure 5:
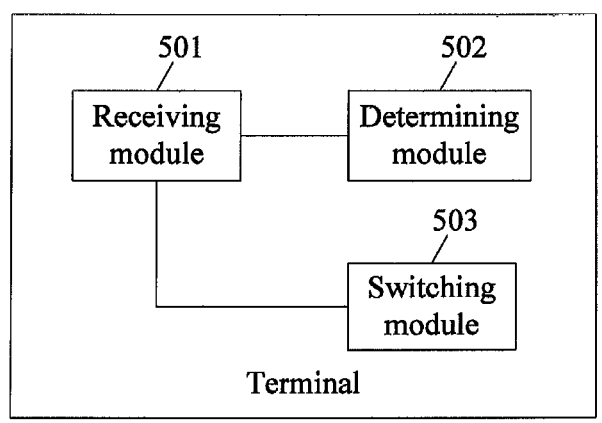
FIG. 5 shows a structure of a terminal provided in a fifth embodiment of the present invention.

As shown in FIG. 5, a terminal provided in this embodiment includes:

an obtaining module 501, adapted to obtain primary carrier selection information notified by an NB; and a determining module 502, adapted to determine a downlink carrier corresponding to an uplink carrier of the terminal as a downlink primary carrier for transmitting data according to the primary carrier selection information.

The obtaining module 501 is further adapted to receive the notification sent by the NB as an indication of switching the primary carrier.

Therefore, the terminal further includes:

a switching module 503, adapted to switch the downlink primary carrier according to the notification received by the obtaining module 501.

Embodiment 6

Figure 6:
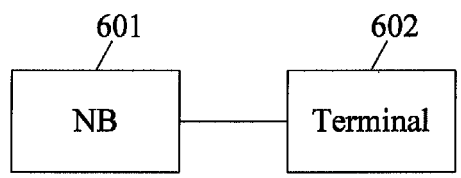
FIG. 6 shows a structure of a system for selecting a downlink primary carrier for transmitting data in a sixth embodiment of the present invention.

A system for selecting a downlink primary carrier for transmitting data is provided in this embodiment. As shown in FIG. 6, the system includes:

an NB 601, adapted to configure primary carrier selection information of a terminal 602, and notify the primary carrier selection information to the terminal 602, where the primary carrier selection information indicates that a downlink carrier corresponding to an uplink carrier of the terminal serves as a downlink primary carrier of the terminal 602; and the terminal 602, adapted to obtain the primary carrier selection information sent by the NB 601, and determine a downlink carrier corresponding to an uplink carrier of the terminal 602 as a downlink primary carrier for transmitting data according to the primary carrier selection information.

In the method, apparatus and system for selecting a primary carrier for transmitting data in the embodiments of the present invention, the network selects a downlink carrier corresponding to an uplink carrier of the terminal as a downlink primary carrier for transmitting data. The terminal needs to detect only the downlink primary carrier, and the downlink carrier needs to be switched or detected only if the primary carrier receives a signaling message for detecting or receiving other carriers, so it is not necessary to switch or detect the downlink carrier frequently, which reduces battery consumption of the terminal.

According to the descriptions above, those skilled in the art understand that the present invention may be implemented by hardware only, or preferably in most circumstances, by software and a necessary universal hardware platform. Therefore, the essence or novelty of the technical solution under the present invention may be embodied in a software product. The software product is stored in a computer-readable storage medium, and incorporates several indications for indicating that a device needs to execute the method specified in any embodiment of the present invention.

The above embodiments are merely provided for describing the technical solution of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A method for selecting a primary carrier for transmitting data, comprising:
configuring, by a network device, multiple downlink carriers for a terminal;
configuring, by the network device, a primary carrier of the terminal, wherein the primary carrier comprises: a downlink primary carrier and an uplink primary carrier, a downlink carrier corresponding to an uplink carrier of the terminal serves as the downlink primary carrier, and the uplink carrier is the uplink primary carrier; and
obtaining, by the network device, channel resources of ACKnowledgement (ACK)/Negative ACKnowledgement (NACK) messages corresponding to the multiple downlink carriers of the terminal on the uplink primary carrier;
wherein, at least part of channel resources of the ACK/NACK messages corresponding to the multiple downlink carriers of the terminal on the uplink primary carrier are obtained according to a rule of mapping between at least one Physical Downlink Control Channel (PDCCH) on the downlink primary carrier and at least one ACK/NACK channel on the uplink primary carrier; another part of channel resources of the ACK/NACK messages corresponding to the multiple downlink carriers of the terminal on the uplink primary carrier are obtained according to a rule of mapping between at least one PDCCH on a downlink non-primary carrier and at least one other ACK/NACK channel on the uplink primary carrier.

2. The method according to claim 1, wherein:
the rule of mapping between the at least one PDCCH on the downlink primary carrier and the at least one ACK/NACK channel on the uplink primary carrier complies with Long Term Evolution (LTE) system mapping method.

3. The method according to claim 1, wherein:
the rule of mapping between the at least one PDCCH on the downlink non-primary carrier and the at least one other ACK/NACK channel on the uplink primary carrier complies with mapping method different from Long Term Evolution (LTE) system mapping method.

4. The method according to claim 1, wherein:
the at least part of channel resources of the ACK/NACK messages corresponding to the multiple downlink carriers of the terminal on the uplink primary carrier are obtained according to mapping to first Control Channel Element (CCE) sequence number occupied by the at least one PDCCH on the downlink primary carrier, or according to mapping to multiple CCE sequence numbers occupied by the at least one PDCCH on the downlink primary carrier.

5. The method according to claim 1, wherein:
Voice Over IP (VoIP) service for the terminal is transmitted on the downlink primary carrier and the uplink primary carrier.

6. A method for selecting a primary carrier for transmitting data, comprising:
determining, by a terminal, a primary carrier, wherein the primary carrier comprises: a downlink primary carrier and an uplink primary carrier, a downlink carrier corresponding to an uplink carrier of the terminal serves as the downlink primary carrier, and the uplink carrier is the uplink primary carrier; and obtaining, by the terminal, channel resources of ACKnowledgement (ACK)/Negative ACKnowledgement (NACK) messages corresponding to multiple downlink carriers of the terminal on the uplink primary carrier;

wherein, at least part of channel resources of the ACK/NACK messages corresponding to the multiple downlink carriers of the terminal on the uplink primary carrier are obtained according to a rule of mapping between at least one Physical Downlink Control Channel (PDCCH) on the downlink primary carrier and at least one ACK/NACK channel on the uplink primary carrier; another part of channel resources of the ACK/NACK messages corresponding to the multiple downlink carriers of the terminal on the uplink primary carrier are obtained according to a rule of mapping between at least one PDCCH on a downlink non-primary carrier and at least one other ACK/NACK channel on the uplink primary carrier.

7. The method according to claim 6, wherein:
the rule of mapping between the at least one PDCCH on the downlink primary carrier and the at least one ACK/NACK channel on the uplink primary carrier complies with Long Term Evolution (LTE) system mapping method.

8. The method according to claim 6, wherein:
the rule of mapping between the at least one PDCCH on the downlink non-primary carrier and the at least one other ACK/NACK channel on the uplink primary carrier complies with mapping method different from Long Term Evolution (LTE) system mapping method.

9. The method according to claim 6, wherein:
the at least part of channel resources of the ACK/NACK messages corresponding to the multiple downlink carriers of the terminal on the uplink primary carrier are obtained according to mapping to first Control Channel Element (CCE) sequence number occupied by the at least one PDCCH on the downlink primary carrier, or according to mapping to multiple CCE sequence numbers occupied by the at least one PDCCH on the downlink primary carrier.

10. The method according to claim 6, wherein:
Voice Over IP (VoIP) service for the terminal is transmitted on the downlink primary carrier and the uplink primary carrier.

11. A NodeB (NB), comprising a processing hardware platform executing instructions stored on a non-transitory computer-readable storage medium to cause the NB to:
configure multiple downlink carriers for a terminal;
select a primary carrier of the terminal, wherein the primary carrier comprises: a downlink primary carrier and an uplink primary carrier, a downlink carrier corresponding to an uplink carrier of the terminal serves as the downlink primary carrier, and the uplink carrier is the uplink primary carrier; and obtain channel resources of ACKnowledgement (ACK)/Negative ACKnowledgement (NACK) messages corresponding to the multiple downlink carriers of the terminal on the uplink primary carrier;

wherein, at least part of channel resources of the ACK/NACK messages corresponding to the multiple downlink carriers of the terminal on the uplink primary carrier are obtained according to a rule of mapping between at least one Physical Downlink Control Channel (PDCCH) on the downlink primary carrier and at least one ACK/NACK channel on the uplink primary carrier; another part of channel resources of the ACK/NACK messages corresponding to the multiple downlink carriers of the terminal on the uplink primary carrier are obtained according to a rule of mapping between at least one PDCCH on a downlink non-primary carrier and at least one other ACK/NACK channel on the uplink primary carrier.

12. The NB according to claim 11, wherein:
the rule of mapping between the at least one PDCCH on the downlink primary carrier and the at least one ACK/NACK channel on the uplink primary carrier complies with Long Term Evolution (LTE) system mapping method.

13. The NB according to claim 11, wherein:
the rule of mapping between the at least one PDCCH on the downlink non-primary carrier and the at least one other ACK/NACK channel on the uplink primary carrier complies with mapping method different from Long Term Evolution (LTE) system mapping method.

14. The NB according to claim 11, wherein:
the at least part of channel resources of the ACK/NACK messages corresponding to the multiple downlink carriers of the terminal on the uplink primary carrier are obtained according to mapping to first Control Channel Element (CCE) sequence number occupied by the at least one PDCCH on the downlink primary carrier, or according to mapping to multiple CCE sequence numbers occupied by the at least one PDCCH on the downlink primary carrier.

15. The NB according to claim 11, wherein:
Voice Over IP (VoIP) service for the terminal is transmitted on the downlink primary carrier and the uplink primary carrier.

16. A terminal, comprising a processing hardware platform executing instructions stored on a non-transitory computer-readable storage medium to cause the terminal to:
determine a primary carrier, wherein the primary carrier comprises: a downlink primary carrier and an uplink primary carrier, a downlink carrier corresponding to an uplink carrier of the terminal serves as the downlink primary carrier, and the uplink carrier is the uplink primary carrier; and obtain channel resources of ACKnowledgement (ACK)/Negative ACKnowledgement (NACK) messages corresponding to multiple downlink carriers of the terminal on the uplink primary carrier;

wherein, at least part of channel resources of the ACK/NACK messages corresponding to the multiple downlink carriers of the terminal on the uplink primary carrier are obtained according to a rule of mapping between at least one Physical Downlink Control Channel (PDCCH) on the downlink primary carrier and at least one ACK/NACK channel on the uplink primary carrier; another part of channel resources of the ACK/NACK messages corresponding to the multiple downlink carriers of the terminal on the uplink primary carrier are obtained according to a rule of mapping between at least one PDCCH on a downlink non-primary carrier and at least one other ACK/NACK channel on the uplink primary carrier.

17. The terminal according to claim 16, wherein:
the rule of mapping between the at least one PDCCH on the downlink primary carrier and the at least one ACK/NACK channel on the uplink primary carrier complies with Long Term Evolution (LTE) system mapping method.

18. The terminal according to claim 16, wherein:
the rule of mapping between the at least one PDCCH on the downlink non-primary carrier and the at least one other ACK/NACK channel on the uplink primary carrier complies with mapping method different from Long Term Evolution (LTE) system mapping method.

19. The terminal according to claim 16, wherein:
the at least part of channel resources of the ACK/NACK messages corresponding to the multiple downlink carriers of the terminal on the uplink primary carrier are obtained according to mapping to first Control Channel Element (CCE) sequence number occupied by the at least one PDCCH on the downlink primary carrier, or according to mapping to multiple CCE sequence numbers occupied by the at least one PDCCH on the downlink primary carrier.

20. The terminal according to claim 16, wherein:
Voice Over IP (VoIP) service for the terminal is transmitted on the downlink primary carrier and the uplink primary carrier.

\* \* \* \* \*